Oct. 8, 1940.   C. R. PATON   2,216,959
MOTOR VEHICLE
Filed Sept. 23, 1938

INVENTOR.
Clyde R. Paton
BY Tibbetts & Hart
ATTORNEYS

Patented Oct. 8, 1940

2,216,959

UNITED STATES PATENT OFFICE 2,216,959

MOTOR VEHICLE

Clyde R. Paton, Birmingham, Mich., assignor to Packard Motor Car Company, Detroit, Mich., a corporation of Michigan Application September 23, 1938, Serial No. 231,296

7 Claims. (Cl. 267—20)

This invention relates to motor vehicles and more particularly to wheel suspension systems.

It is customary to connect vehicle wheels with the frame by elastic systems. In many of the vehicles now being manufactured, the front wheels are independently connected with the frame by mountings that include a spindle carrier, a pair of parallel links pivotally connecting the carriage to the frame, and some form of spring and shock absorber associated between the links and the frame. The connections of the link structures with the frame were at first of a character such that forces resulting from wheel impacts were transmitted directly to the frame causing a harsh ride. In order to overcome this undesirable riding condition, some form of elastic means such as rubber is now commonly employed in the link structures to substantially isolate the frame from forces resulting from wheel impacts. Such isolation of the frame from the wheels improves the ride materially but allows vibration of the elastic wheel supporting systems that causes objectionable vibrational disturbances in the steering system associated therewith.

It is an object of this invention to provide a wheel suspension system for vehicles in which vibrational disturbances are substantially absorbed so that they are not transmitted to the frame or the steering system to any noticeable extent.

Another object of the invention is to provide mounting means for vehicle wheels that will damp substantially all vibrational disturbances caused by loads resulting from wheel impacts.

A further object of the invention is to utilize a portion of a wheel mounting structure of a motor vehicle for damping vibrations therein resulting from forces developed by wheel impacts.

Still another object of the invention is to provide damping means in an elastic system for connecting motor vehicle wheels with a frame that will substantially isolate the steering mechanism and frame from vibrational disturbances.

Other objects of the invention will appear from the following description taken in connection with the drawing, which forms a part of this specification, and in which.

Figure 1:
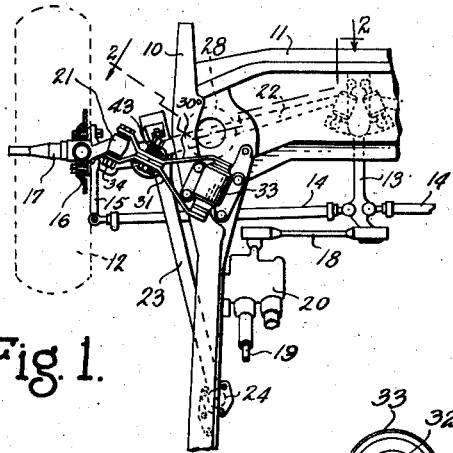
Fig. 1 is a fragmentary plan view of the front end of a motor vehicle having the invention incorporated therewith.
Figure 4:
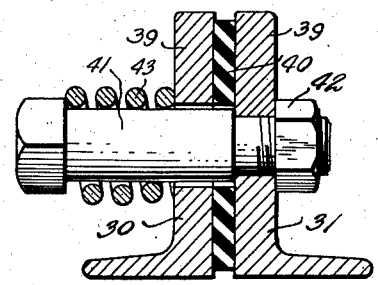
Fig. 4 is a sectional view of the wheel mounting taken on line 4—4 of Fig. 2.
Figure 2:
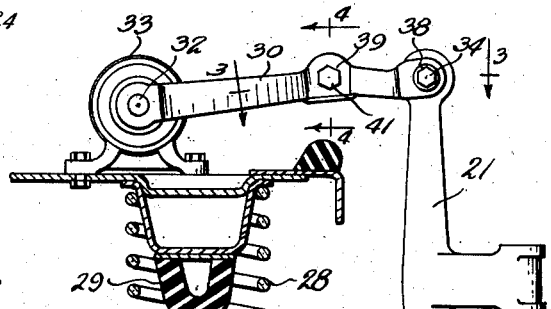
Fig. 2 is a sectional view of a wheel mounting taken on line 2—2 of Fig. 1.
Figure 3:
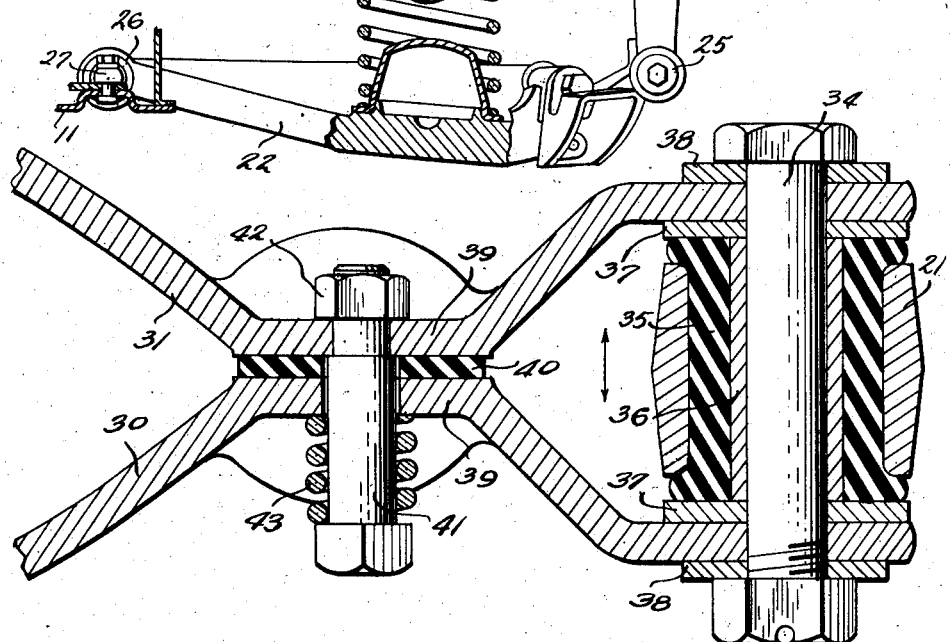
Fig. 3 is a sectional view of the wheel mounting taken on line 3—3 of Fig. 2.

Referring to the drawing, a motor vehicle frame of a conventional type is illustrated and consists of a pair of spaced side members, as indicated at 10, joined together by a plurality of transverse members, the forward member being indicated at 11. The usual steering wheels, as indicated at 12, are arranged on opposite sides of the forward end of the frame and are steered through manipulation of a conventional form of mechanism consisting of a central link 13 pivoted at its forward end to the underside of the front cross member 11 and connected with the wheels by tie rods 14 and arms 15, the steering arms being secured to plates 16 carried by the wheel spindles 17. The link 13 is swung transversely of the vehicle by link 18 that is connected with a hand wheel operated rod 19 by gear mechanism contained within the casing 20.

The steering wheels are connected with the frame by independent elastic mountings. In each mounting system there is a carrier 21 on which a wheel spindle 17 is mounted for rotation in the usual manner, and connecting the carrier with the frame is a pair of vertically spaced link structures. The lower link structures consist of a transversely extending arm 22 and a longitudinally extending arm 23, the arm 23 being fixed at its forward end to the arm 22 and being mounted at its rear end in the socket bearing 24. The outer ends of the arms 22 are pivotally connected to the lower ends of the carriers 21 in suitable roller bearings 25, and the inner ends of these arms are carried by rubber bushings 26 mounted on pins 27 fixed to the underside of the cross frame member 11. The socket bearings 24 are provided with suitable rubber sleeves in which ball ends of the arms 23 engage. Between each arm 22 and the frame is arranged a coil spring 28 and rubber bumpers 29 are arranged on the frame to limit the upward movement of the links.

The structure so far described forms the subject matter of my Patent No. 2,153,615, dated April 4, 1939. In such application the upper link structures are formed as integral units and are isolated from the carriers at their pivotal connections therewith by rubber sleeves and as the lower links are also isolated from the frame by rubber, vibrational disturbances in the wheel mountings will not flow freely to the frame but they are free to flow to the steering mechanism. Such vibrational disturbance in the steering mechanism is obviously objectionable to the driver of the vehicle.

It is a purpose of this invention to substantially isolate both the frame and the steering mechanism from vibrational disturbances in the wheel mountings from forces resulting from wheel impacts. In order to prevent vibrations in the wheel mounting structures, of the type described, from flowing to the steering mechanism, damping means is introduced into these structures. As one means of accomplishing this result, damping means is introduced into the upper link structures of the wheel mountings.

The upper link structures are similar and each comprises two sections 30 and 31 having an end fixed to a piston carrying shaft 32 of a shock absorber casing 33 fixed on the frame and the other end pivotally mounted on a bolt 34 extending through an eye at the upper end of the adjacent carrier 21. The link sections are formed so that their ends are spaced sufficiently to straddle the carrier and the shock absorber casing. A rubber bushing 35 extends between the bolt and the carrier and between the bushing and the bolt is a metal sleeve 36. The bolt extends through washers 37 at the inner adjacent faces of the link sections and through washers 38 adjacent the remote faces of the link sections. The bolt is drawn up sufficiently to compress the rubber bushing so that it is held tightly between bushing 36 and the carrier and to force the end portions radially between the carrier and the washers 37, thus isolating this end of the carrier from the frame.

The link structure sections 30 and 31 are formed with a flat central portion 39 so that their adjacent faces will lie in relatively close parallel relation and between such faces is arranged a damping element in the form of a friction disk 40. A bolt 41 extends through these flat portions of the link structure sections and the damping disk and has screwed upon one end thereof a nut 42. The bolt is formed of two diameters, the smaller diameter portion being threaded to receive the nut 42 and having a relatively close fit with the opening in the flat portion section 31. The larger diameter portion of the bolt extends through the damping element and the opening in the link structure section 31. The bolt is clamped tightly to the section 31 by the shoulder formed by the junction of the two diameters thereof and the nut. There is clearance between the bolt and the damping element and the link structure section 30, and between the link structure section 30 and the head of the bolt is arranged a coil spring 43. This spring is anchored against the head of the bolt and exerts relatively high pressure against the link section 30 urging it toward the link section 31 so that the damping element 40 will be held in frictional engagement with the adjacent faces on the flat portions of the link structure sections.

When the vehicle wheel meets an obstruction in its path of movement, the resulting force applies a load tending to rock the carrier rearwardly about its lower pivot which will set up vibration disturbances in the wheel mounting and the steering mechanism but the upper link structure herein described damps this fore and aft movement of the carrier about its lower connection because the sections of the upper link structure can move relatively a limited extent and such relative movement is opposed by the damping element 40. In other words, wheel impact forces transmitted to the carrier will cause the carrier to move fore and aft at its upper end and the bolt 34 will move fore and aft causing a relative sliding motion of the upper link structure sections that will be damped by the friction disk 40 to prevent the usual vibrational disturbances caused by deflections when the upper link is a rigid structure. By thus damping the carrier and wheel movements resulting from impact forces, vibrational disturbances ordinarily created thereby will be materially reduced so that their flow to the steering mechanism will not be noticeable. In the structure herein described the frame is substantially isolated from vibration disturbances in the wheel supporting structures by rubber and such disturbances are damped to an extent that their transfer to the steering mechanism will be substantially reduced and not noticeable by the driver holding the steering wheel.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a wheel suspension system for motor vehicles, a link structure comprising a pair of coextensive sections having relatively movable portions, and vibration damping means coacting with said portions to resist relative movement thereof resulting from wheel impact force deflections.

2. In a motor vehicle having a frame, steering wheel supporting mechanism comprising superposed link structures pivoted at their inner ends to the frame for up and down movement, a wheel spindle carrier pivoted to the outer ends of the link structures, said carrier being elastically isolated from the frame, means damping vertical movement of the link structures, and means damping fore and aft vibration of the carrier induced by wheel impact forces and tending to deflect the link structures.

3. In a motor vehicle having a frame, a supporting structure comprising a carrier, a steering wheel spindle on the carrier, a pair of laterally extending superposed link structures pivotally connected to the frame at their inner ends and pivotally supporting the carrier at their outer ends, elastic means at the pivotal connection between the upper link and the carrier and at the pivotal connection between the lower link and the frame damping vibrational transfer at such connections, means damping vertical movement of said link structures, and means associated with the upper link to damp deflection vibrations in the supporting structure developed by wheel impact forces.

4. In a motor vehicle having a frame and steering mechanism carried by the frame, a steering wheel supporting structure comprising links connected to the frame, a wheel spindle connected with the steering mechanism, a carrier for the spindle extending between and pivotally carried at its ends by the links, rubber means in the connections between the upper link and the carrier and between the frame and the lower link, and friction means in the supporting structure absorbing vibrational deflection disturbances developed therein by wheel impact forces.

5. In a motor vehicle having a frame and steering mechanism anchored to the frame, a steering road wheel suspension comprising a wheel spindle connected to the steering mechanism, a spindle carrier, superposed link structures pivotally supporting the carrier and pivoted to the frame, one of said links having two spaced parallel sections, elastic means at the connection of the sectional link structure with the carrier and at the connection of the other link structure with the frame for damping vibration transfer at such points, and friction means associated with the sectional link structure and operative upon deflection thereof to damp the vibrational disturbances induced by wheel impact forces.

6. In a motor vehicle having a frame, a wheel suspension comprising laterally extending superposed link structures pivoted at their inner ends to the frame for up and down movement, a wheel spindle carrier pivotally supported at the outer ends of said links, elastic means at the connection between the upper link structure and the carrier and between the lower link structure and the frame damping vibration transfer at these points, and means forming an intermediate part of the upper link structure for damping vibration developed in the suspension upon deflection resulting from wheel impact forces that rock the upper link rearwardly and the lower link forwardly.

7. In a motor vehicle, the combination with a wheel supporting structure having superposed links pivoted at one end to the vehicle frame and at the other end to a wheel carrier, of vibration damping means intermediate the pivoted ends of the upper link and coacting therewith to resist fore and aft movement of the carrier induced by wheel impact forces.

CLYDE R. PATON.